United States Patent [19]

Zorina et al.

[11] 4,206,505
[45] Jun. 3, 1980

[54] RANDOM PROCESS INITIAL MOMENTS COMPUTER

[76] Inventors: Nadezhda A. Zorina, ulitsa Stroitelnaya, 8, kv. 10, Zhukovsky Moskovskoi oblasti; Evgeny V. Kazmin, ulitsa Gurieva, 1, kv. 57, Ramenskoe Moskovskoi oblasti, both of U.S.S.R.

[21] Appl. No.: 909,660

[22] Filed: May 25, 1978

[51] Int. Cl.² .............................................. G06F 15/36
[52] U.S. Cl. ...................................... 364/554; 364/736
[58] Field of Search ................................. 364/554, 736

[56] References Cited
U.S. PATENT DOCUMENTS

| | | | |
|---|---|---|---|
| 3,549,877 | 12/1970 | Goldman | 364/554 |
| 3,833,797 | 9/1974 | Grobman et al. | 364/554 X |

*Primary Examiner*—Jerry Smith
*Attorney, Agent, or Firm*—Haseltine, Lake & Waters

[57] ABSTRACT

A digital computing device for determining k-th order uni-dimensional initial moments of random processes which comprises a function converter designed as a unit for determining the input signal interval number and a memory connected to it, the memory being connected to a parallel counter-type adder that is connected to a control unit coupled with a summary counter and said function converter.

6 Claims, 1 Drawing Figure

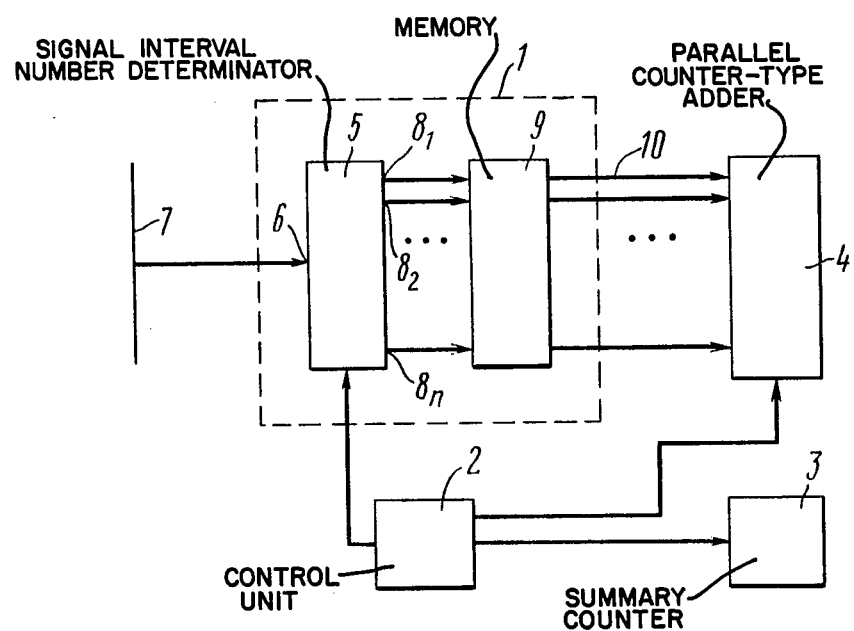

RANDOM PROCESS INITIAL MOMENTS COMPUTER

FIELD OF APPLICATION

The invention relates to dedicated computing devices intended to determine the characteristics of random processes and in particular, to digital computing devices for calculating unidimensional initial moments of the k-th order.

The present invention can be used in all scientific or technological applications where it is required to determine the characteristics of a random process.

The devices of this type are required, for instance, in case when a unidimensional law governing the probability distribution of instant values of a random process is determined experimentally. This law is the most commonly used characteristic of random processes.

In this case the initial moments serve as approximation coefficients used to present the distribution law curve and the greater the number of initial moments that have been determined the higher the accuracy with which the experimental function approaches the theoretical one.

Besides, the knowledge of the valve of the k-th order initial moment of a random process which represents the variations of a mechanical stress in a structure element in the course of operation is quite necessary for calculating the value of the fatigue damage accumulated in the given element.

BACKGROUND OF THE INVENTION

The prior art knows a digital computing device for determining k-th order initial moments of random processes (Author's Certificate 227709. Bulletin No 30, 1968).

This device comprises a function converter for calculating the k-th orders of random process samples, a control unit connected to the function converter and a summary counter connected to the control unit.

The functions of the control unit in the known device are performed by a clock pulse generator.

Connected to the output of the function converter is an analog-to-digital converter (ADC) intended to convert analog values into a numeric-pulse code. The output of the ADC is connected, via a first AND-circuit, to the summing input of a bidirectional counter.

The device known in the art comprises also a sawtooth voltage generator connected to the input of a comparator having its outputs connected to the inputs of two flip-flops. The output of one flip-flop is connected to the input of the first AND-circuit and the output of the second flip-flop is connected to the input of a second AND-circuit having its output connected to the countdown input of the bidirectional counter.

The digital computing device known in the art suffers from a relatively low accuracy at which it can process the data describing a random process since a highly accurate analog function converter is practically impossible to design for high k-th order degrees of random process samples.

Besides, the known digital computing device suffers from a relatively low speed of operation since it uses the method of serial number adding.

BRIEF DESCRIPTION OF THE INVENTION

The object of the present invention is to increase the accuracy of processing the data describing a random process and to raise the speed of the digital computing device used for this purpose.

The essence of the present invention consists in that a digital computing device for calculating k-th order unidimensional initial moments of random processes which comprises: a function converter for calculating the k-th orders of random process samples; a control unit connected to said function converter; a summary counter connected to said control unit, comprises also, according to the invention, a parallel counter-type adder connected to said control unit, while the function converter is designed as a unit for determining the input signal interval number provided with at least eight outputs and with an input that is connected to a wire serving to apply the input signal characterizing the random process, the unit being connected also to address wires of a memory having its output digit wires connected to similar input digit wires of the parallel counter-type adder.

Conveniently the unit for determining the input signal interval number is designed as a level determinator.

Conveniently also the unit for determining the input signal interval number is designed as a decoder.

The invention makes it possible to increase the accuracy and to speed up considerably the procedure of determining the values characterizing a random process, which is exceptionally important in case random processes have to be indentified without delay.

BRIEF DESCRIPTION OF DRAWINGS

The invention will be better understood from the following description of its embodiment given by way of example and shown in the accompanying drawing which presents a functional diagram of the digital computing device according to the invention.

DETAILED DESCRIPTION OF THE INVENTION

The digital computing device proposed herein comprises a function converter 1 for calculating the k-th orders of random process samples, a control unit 2 connected to the function converter 1, a summary counter 3 connected to the control unit 2.

The digital computing device comprises also a parallel counter-type adder 4 connected to the control unit.

The function converter 1 is designed as a unit 5 for determining the input signal interval number provided with an input 6 which is connected to a bus 7 serving to apply the signal that characterizes the random process and with at least eight outputs $8_1, 8_2, \ldots 8_n$, the unit being combined with a memory 9 having its address wires connected to said unit and its output digit wires 10 connected to similar input digit wires of said parallel counter-type adder 4.

The unit 5 for determining the input signal interval number may be designed as a level discriminator in case the input signal is analog in format.

If, however, the input is represented by a digital signal the unit 5 may be designed as a decoder.

Instead of the term "random process" the following description of the operation of the device proposed herein will use the term "random signal".

The value of the k-th order initial moment is calculated with the use of the formula $$M[x^k] = \frac{\sum_{i=1}^{N} Q_{ij}}{N}$$

where
- i is the serial number of a sample,
- N is the total number of random signal samples, and characterizes the accuracy with which the final result has been calculated.

The device proposed herein will calculate the value of $\Sigma Q_{ij}$ and the value of N. Then, to find the value of $M^x[x^k]$ the above values are divided either manually or with the help of respective computing means. The smaller the required difference between the determined value of the initial moment and the actual value thereof the greater should be the number of samples, i.e. the higher should be the value of N.

If it is requied that all the initial moments should be calculated with an equal accuracy the number of samples will have to be increased with the growth of the order k of the initial moment.

Taking into account the random signal distribution law which is known roughly a priori and the required accuracy of calculations it is possible to find the required value of N beforehand and to process the random signal until the result displayed by the device exceeds the present value.

The magnitude of Q is a complex function of the random signal sample value, the initial moment order k and the random signal distribution law. Generally it has an infinite set of values.

The device proposed herein uses a set of n values: $Q_1, Q_2, \ldots, Q_j, \ldots, Q_n$. Every value of Q from the above set $Q_1, \ldots, Q_j, \ldots Q_n$ should correspond to one interval of random signal samples. Hence, the whole range of values of the random signal samples is divided into n intervals.

In case the random signals to be processed are amplitude-normalized with the use of a scale amplifier the range of values of random signal samples can be made constant. Also constant will then become the parameters of intervals and hence, the values $Q_1, \ldots Q_j, \ldots Q_n$.

These values $Q_1, \ldots Q_j, \ldots Q_n$, therefore can be calculated beforehand.

However the effect of standardizing the random signals to be processed on the accuracy of determining the value of $M^x(x^k)$ should be taken into account while performing final calculations.

In order to determine the k-th order initial moment with a practically acceptable accuracy it is sufficient to divide the standardized range of random signal variations into 8 to 32 intervals, i.e. it is sufficient to have a set of 8 to 32 values of Q.

The intervals could be of equal lengths (uniform division of the range) or of different lengths (non-uniform division of the range).

Consider the operation of the digital computing device.

The required number n of intervals is selected taking into account the order k of the initial moment, the required accuracy of the computed result and the a priori information on the random signal distribution law.

Then the n values of Q ($Q_1, \ldots Q_j, \ldots, Q_n$) are calculated. In a particular case the degree of the sample k-th order is taken for the value of $Q_j$, the sample corresponding to the middle of the j-interval.

The values of Q are then coded with any of known digital codes and recorded in succession of their numbers in the memory 9.

In case the input signal is analog a level discriminator is used. If the input signal is digital a decoder is used.

The counter-type adder 4 and the summary counter 3 are set to their initial positions.

After the wire 7 is fed with the random signal to be analyzed the clock pulse generator in the control unit 2 is actuated.

In accordance with the command from the control unit 2 the unit 5 for determining the unit signal interval number will generate a signal appearing at one of the outputs $8_1, \ldots 8_n$. This signal excites the respective address wire of the memory 9. The memory generates a multibit digital code appearing at its output and corresponding to one of the values Q.

The use of digital computer components in the function converter makes it possible to increase the accuracy of determining the characteristics of a random process.

A signal from the control unit 2 makes the parallel counter-type adder 4 accept the above code and add it to the one that has already been stored in it. The method of parallel adding allows to increase the speed of operation of the device.

Simultaneously the content of the summary counter 3 becomes one unit greater.

The device will continue operating until the indications of the summary counter 3 exceed the preset value of N or until the random signal to be processed is turned off.

When the device stops operating two numbers will be readout-one that is contained in the counter-type adder 4 will represent the value of $\Sigma Q_{ij}$, the other that is contained in the summary counter 3 will represent the value of N. As it has been shown above, the value of the initial moment k-th order is obtained by dividing the value of $\Sigma Q_{ij}$ by the value of N.

The device proposed herein makes it possible to increase the accuracy and to considerably simplify the procedure of determining the characteristics of a random process.

What is claimed is:

1. A digital computing device for determining k-th order undimensional initial moments of random processes which comprises: a wire for applying the input signal; address wires; a function converter receiving said input signal characteristic of the random process for calculating the k-th orders of random process samples comprising: a unit for determining the number of input signal intervals and a memory connectd to receive output signals of said unit with said address wires; a control unit connected to said function converter; a summary counter connectd to receive output signals of said control unit; a parallel counter-type adder connected to receive said control unit output signals and said memory output signals.

2. A digital computing device as claimed in claim 1, wherein said unit for determining the number of input signal intervals comprises a level discriminator.

3. A digital computing device as claimed in claim 1, wherein said unit for determining the number of input signal intervals comprises a decoder.

4. A digital device for determining k-th order initial moments of random processes characteristic of an input signal, comprising: a wire for applying said input signal; address wires; said address wires equal in number to the number of the dissection intervals included in a range of variation of said input signal; a function converter for calculating the k-th orders of random process samples; a number determining unit for determining the numbers of said intervals of said input signal, belonging to said function converter; inputs and n outputs of said number determining unit; a first one of said inputs coupled to said wire for applying the input signal; a memory belonging to said function converter; n inputs and outputs of said memory; n outputs of said number determining unit, coupled to said n inputs of said memory via said address wires; a control unit having outputs; a first one of said outputs of said control unit being coupled to a second one of said inputs of said number determining unit; a summary counter having an input coupled to a second one of said outputs of said control unit; digit wires; a parallel counter-type adder having data inputs and a control input, said data inputs being coupled to said outputs of said memory via said digit wires, and said control input being coupled to a third one of said outputs of said control unit.

5. A digital device as claimed in claim 4, wherein said number determining unit comprises a level discriminator.

6. A digital device as claimed in claim 4, wherein said number determining unit comprises a decoder.

* * * * *